United States Patent
Nasuno et al.

(10) Patent No.: US 11,868,149 B2
(45) Date of Patent: Jan. 9, 2024

(54) POWER CONTROL SYSTEM AND POWER CONTROL METHOD

(71) Applicant: KANEKA CORPORATION, Osaka (JP)

(72) Inventors: Yoshiyuki Nasuno, Osaka (JP); Haruya Mori, Osaka (JP)

(73) Assignee: KANEKA CORPORATION, Osaka (JP)

(*) Notice: Subject to any disclaimer, the term of this patent is extended or adjusted under 35 U.S.C. 154(b) by 240 days.

(21) Appl. No.: 17/391,985

(22) Filed: Aug. 2, 2021

(65) Prior Publication Data
US 2021/0365057 A1  Nov. 25, 2021

Related U.S. Application Data

(63) Continuation of application No. PCT/JP2020/004165, filed on Feb. 4, 2020.

(30) Foreign Application Priority Data

Feb. 5, 2019 (JP) ................................. 2019-018719

(51) Int. Cl.
*G05F 1/46* (2006.01)
*H02J 3/32* (2006.01)

(52) U.S. Cl.
CPC . *G05F 1/46* (2013.01); *H02J 3/32* (2013.01)

(58) Field of Classification Search
CPC . G05F 1/46; H02J 3/32; H02J 2300/22; H02J 3/381; H02J 13/00022; Y02E 40/70;
(Continued)

(56) References Cited

U.S. PATENT DOCUMENTS

2013/0015703 A1\* 1/2013 Rouse ....................... H02J 3/06
 307/18
2013/0229059 A1 9/2013 Baba et al.
(Continued)

FOREIGN PATENT DOCUMENTS

JP H03-293930 A 12/1991
JP 2002-374629 A 12/2002
(Continued)

OTHER PUBLICATIONS

Takashi Ikegami et al., Charging and Discharging Operation Algorithms of Home Storage Battery under Constraints of Reverse Power Flow from Residences with PV Systems, IEEJ Transactions on Electronics, Information and Systems, Oct. 1, 2013, vol. 133, No. 10, pp. 1884-1896.
International Search Report issued in PCT/JP2020/004165; dated Mar. 17, 2020.

*Primary Examiner* — Mohammad Ali
*Assistant Examiner* — Saad M Kabir
(74) *Attorney, Agent, or Firm* — Studebaker & Brackett PC

(57) ABSTRACT

A power control system, which enables more effective utilization of electrical power generated by using renewable energy, includes a monitoring unit, an output control unit, and a power storage control unit. The monitoring unit monitors the amount of electrical power generated by a power generation device using renewable energy and the amount of electrical power purchased by a consumer through utility grid. When the amount of purchased electrical power is less than a first threshold on the basis of a monitoring result of the monitoring unit, the output control unit suppresses output of electrical power generated by the power generation device. When the amount of the purchased electrical power is less than a second threshold which is greater than the first threshold on the basis of the monitoring
(Continued)

result, the power storage control unit charges a storage battery with the generated electrical power outputted by the power generation device.

19 Claims, 6 Drawing Sheets

(58) Field of Classification Search
CPC .......... Y02E 60/00; Y02E 70/30; Y02P 90/50;
Y04S 10/123; Y04S 10/14; Y04S 40/126
USPC ....................................................... 700/295
See application file for complete search history.

(56) References Cited

U.S. PATENT DOCUMENTS

2016/0072287 A1* 3/2016 Jia ..................... H02J 3/0073
700/295
2020/0266628 A1 8/2020 Kato et al.

FOREIGN PATENT DOCUMENTS

| JP | 2012-130096 A | 7/2012 |
| WO | 2012/081575 A1 | 6/2012 |
| WO | 2017/098827 A1 | 6/2017 |

* cited by examiner

POWER CONTROL SYSTEM AND POWER CONTROL METHOD

CROSS-REFERENCE TO RELATED APPLICATIONS

This application claims benefit of priority to International Patent Application No. PCT/JP2020/004165, filed Feb. 4, 2020, and to Japanese Patent Application No. 2019-018719, filed Feb. 5, 2019, the entire contents of each are incorporated herein by reference.

BACKGROUND

Technical Field

The present disclosure relates to a power control system and a power control method.

Background Art

In recent years, a power generation device using a renewable energy is not only for electric power companies, but being widely used by general consumers. For example, in the case of using sunlight as a renewable energy, a user who is a general consumer installs a solar photovoltaic device on the roof of a building on their own lot or the like. Then, the user causes a load device used by themselves to operate, by the generated electrical power which is generated by the solar photovoltaic device.

In addition, depending on the case, the user can sell electricity to an electric power company, by reversing power flow of the excess amount of generated electrical power not being consumed themselves to the electric power grid. However, according to the contract terms, etc. with the electric power company, they may be subject to an output limitation to the reverse power flow to the electric power grid, in order for stabilization of local electric power grid. Alternatively, according to the contract terms, etc. with the electric power company, reverse power flow to the electric power grid may not be accepted.

In such cases, it is necessary to configure to stop the reverse power flow in order to adhere to the contract terms, etc. with the electric power company. For example, it is necessary to arrange an RPR (Reverse Power Relay) sensor, which is a reverse power relay, at the power receiving point, and make a configuration which completely stops the power generation device when the detected value of the RPR sensor exceeds the limit value. Alternatively, in the case of monitoring the difference between the consumed power and generated electrical power, for example, and the difference being smaller than a predetermined value, it is necessary to make a configuration which suppresses the output of generated electrical power by a power conditioner for the power generation device. Technology for making such a configuration is disclosed in Japanese Unexamined Patent Application, Publication No. 2012-130096, for example.

SUMMARY

However, with the conventional technology such as the technology disclosed in Japanese Unexamined Patent Application, Publication No. 2012-130096, a part of the renewable energy that should have been available is wasted, due to completely stopping the power generation device, and suppressing the output of the power generation device. For this reason, a loss occurs for the consumer.

The present disclosure was made taking account of such a situation. Therefore, the present disclosure provides a power control system and a power control method, for more effectively using the generated electrical power which is generated using renewable energy.

A power control system according to the present disclosure includes a monitoring unit which monitors a generated electrical power amount which is generated by a power generation device using renewable energy and a purchased electrical power amount purchased by a consumer via an electric power grid; an output control unit which suppresses generated electrical power outputted by the power generation device, in a case being determined that the purchased electrical power amount falls below a first threshold, based on monitoring results of the monitoring unit; and a storage power control unit which performs charging to a storage battery by the generated electrical power outputted by the power generation device, in a case of being determined that the purchased electrical power amount falls below a second threshold which is a threshold greater than the first threshold, based on monitoring results of the monitoring unit.

A power control method according to the present disclosure is a power control method executed by a power control system. The method includes the steps of monitoring a generated electrical power amount generated by a power generation device using a renewable energy, and a purchased electrical power amount purchased by a consumer via an electric power grid; suppressing generated electrical power outputted by the power generation device, in a case of being determined that the purchased electrical power amount falls below a first threshold, based on monitoring results of the monitoring unit; and performing charging by a power storage control unit on a storage battery by generated electrical power outputted by the power generation device, in a case of being determined that the purchased electrical power amount falls below a second threshold which is a threshold greater than the first threshold, based on monitoring results of the monitoring unit.

According to the present disclosure, it is possible to more effectively use the generated electrical power which is generated using renewable energy.

DETAILED DESCRIPTION

Hereinafter, an example of an embodiment of the present disclosure will be explained by referencing the attached drawings.

<System Configuration>

Figure 1:
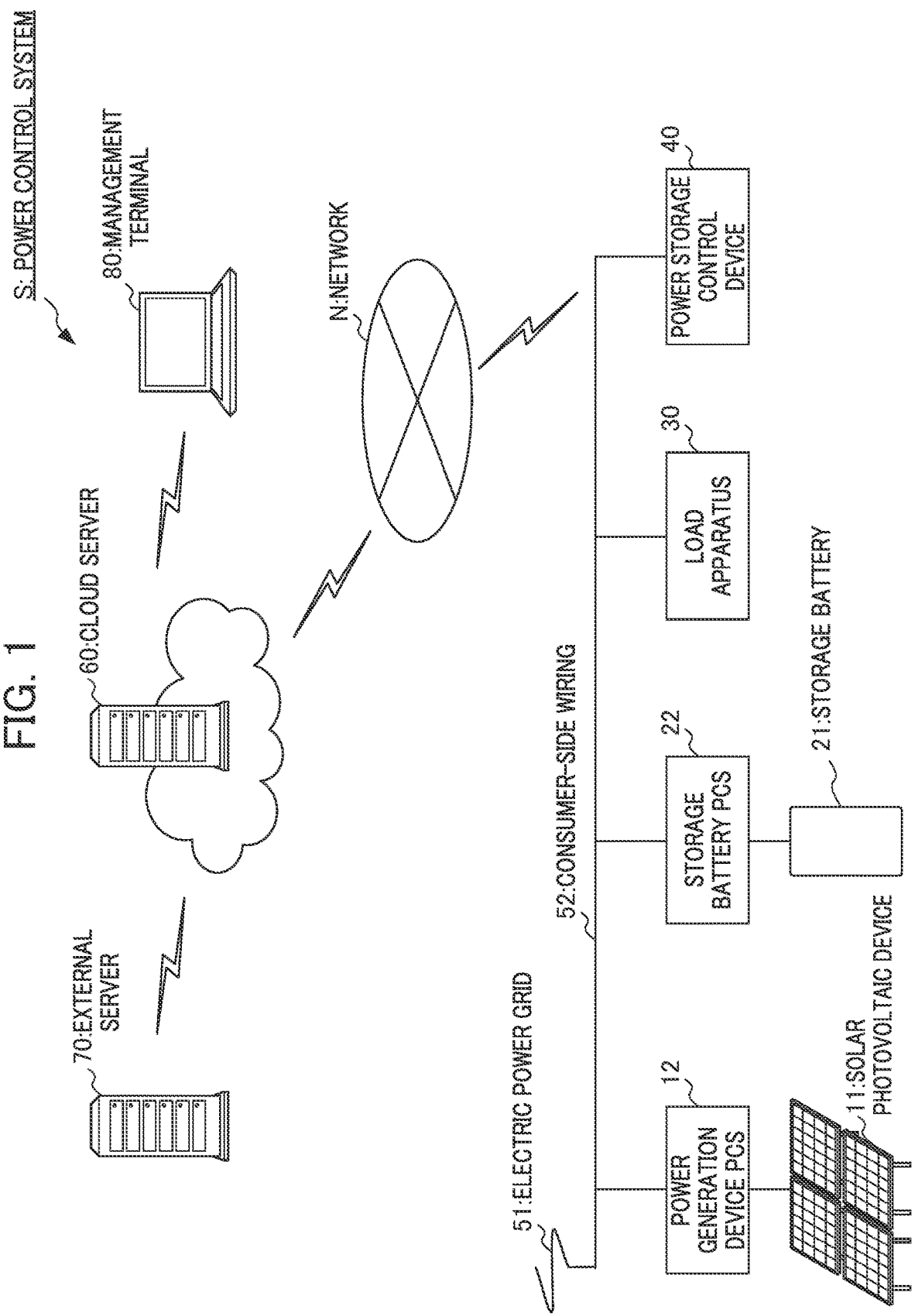
FIG. 1 is a block diagram showing an example of the overall configuration of a power control system according to an embodiment of the present disclosure.

FIG. 1 is a block diagram showing the overall configuration of a power control system S according to the present embodiment. As shown in FIG. 1, the power control system S includes: a solar photovoltaic device 11; a power generation device power conditioner 12; a storage battery 21; a storage battery power conditioner 22; a load apparatus 30; a power storage control device 40; an electric power grid 51; consumer-side wiring 52; a cloud server 60; an external server 70; and a management terminal 80. It should be noted that the "power conditioner" is noted as "PCS" in the drawings.

Herein, the solar photovoltaic device 11; power generation device power conditioner 12; storage battery 21; storage battery power conditioner 22; load apparatus 30; and power storage control device 40 are used by installing in the lot of the consumer, for example. Herein, the consumer may be a business that operates a factory or the like, or may be a general user who uses a house.

The consumer-side wiring 52 connected with the electric power grid 51 by power system interconnection type is constructed in this lot of the consumer. Then, the solar photovoltaic device 11; power generation device power conditioner 12; storage battery 21; storage battery power conditioner 22; load apparatus 30; and power storage control device 40 are connected in parallel to the AC terminals of this consumer-side wiring 52, and are driven by receiving the supply of the generated electrical power generated by the solar photovoltaic device 11 or the purchased electrical power which was purchased from the electric power company via the electric power grid 51.

Herein, as a premise of the following explanation, it is assumed that the consumer is subject to the output limitations related to reverse power flow to the electric power grid 51, according to the contract with the electric power company. It should be noted that, as the renewable energy in the present embodiment, although a case of performing power generation using sunlight is assumed, this is merely an example for explanation. The present embodiment can be applied also to a case of performing power generation using renewable energy other than sunlight, such as wind power, hydro power, geothermal energy and biomass.

The cloud server 60 and external server 70 are used by the operation business of a power control system S. The management terminal 80 is used by the operation business of the power control system S or a consumer.

Each apparatus included in this power control system S is connected to be able to communicate with each other via a network N. The communication between each of these apparatuses may be performed in accordance with any communication system, and this communication system is not particularly limited. In addition, the communication between each apparatus may be performed directly between apparatuses without going through the network N. For example, the communication between the power storage control device 40 and each other apparatus connected to the consumer-side wiring 52 may be directly performed using signal wire which is omitted from illustration.

The power control system S having such a configuration monitors the generated electrical power amount which is generated by the solar photovoltaic device 11 using renewable energy, and the purchased electrical power amount purchased by the consumer via the electric power grid. In addition, the power control system S suppresses the generated electrical power that is outputted of the solar photovoltaic device 11, in the case of determining that the purchased electrical power amount falls below a first threshold, based on the monitoring results. Furthermore, the power control system S performs charging to the storage battery 21, by the generated electrical power that is outputted of the solar photovoltaic device 11, in the case of determining that the purchased electrical power amount falls below a second threshold which is a threshold greater than the first threshold, based on the monitoring results.

For this reason, according to the power control system S, prior to the processing of suppressing generated electrical power for stopping reverse power flow in the case of the purchased electrical power being reduced, it is possible to perform charging to the storage battery 21. Therefore, according to the power control system S, it is possible to solve the aforementioned problem in that a part of the renewable energy which should be available becomes wasted. In addition, accompanying this, it is possible to prevent a loss to the consumer from occurring. In other words, according to the power control system S, it is possible to more effectively apply generated electrical power which is generated using renewable energy.

Next, each apparatus included in the power control system S will be explained in detail. The solar photovoltaic device 11 is a device which performs power generation by converting the solar energy of sunlight into electricity by the photovoltaic effect. By defining a solar string made by connecting a solar cell module in series as one circuit, and connecting each circuit to a connection box, the solar photovoltaic device 11 consolidates DC current generated by each solar cell module into one. This DC current consolidated into one is outputted to the power generation device power conditioner 12 via diodes, switches, etc. for backflow prevention in the connection box.

The power generation device power conditioner 12 includes an inverter which converts the DC current outputted from the solar photovoltaic device 11 to AC current which is generally used at facilities, residences, etc. The AC current converted by the power generation power conditioner 12 is supplied to the storage battery power conditioner 22, load apparatus 30 and power storage control device 40.

The storage battery 21 is a secondary battery which stores electrical power. By the storage battery power conditioner 22 making the power storage in the storage battery 21, it becomes possible to use the load apparatus 30 upon power outage, or use the surplus power generated during the day at night. In addition, it becomes possible to charge with the low cost nighttime electrical power and use during the day. For example, in the present embodiment, in the case of being determined that the purchased electrical power amount falls below the second threshold which is a threshold greater than the first threshold as mentioned above, charging to the storage battery 21 is performed by the generated electrical power which is outputted of the solar photovoltaic device 11. It is thereby possible to more effectively use the generated electrical power.

The storage battery power conditioner 22 includes an inverter which converts the DC current stored in the storage battery 21 into AC current generally used in residences, etc. The AC current converted by the storage battery power conditioner 22 is supplied to the load apparatus 30 and power storage control device 40. It should be noted that, in the present embodiment, the power generation device power conditioner 12 and storage battery power conditioner 22 are provided as separate bodies corresponding to the solar photovoltaic device 11 and storage battery 21; however, they are not limited thereto. For example, it may be configured so as to realize the power generation device power conditioner 12 and battery storage power conditioner 22 by one hybridtype power conditioner corresponding to the solar photovoltaic device 11 and storage battery 21.

The load apparatus 30 includes a plurality of electrical equipment which operate by the electrical power generated by the solar photovoltaic device 11, and electrical power purchased (i.e. power purchase) from the electric power company. The electrical equipment included in the load apparatus 30 are not particularly limited, and electrical equipment such as various machines operating in factories, air-conditioning, or a refrigerator, television and electric water heater (for example, EcoCute) are included in the load apparatus 30.

The battery power storage control device 40 suppresses generated electrical power which is outputted of the solar photovoltaic device 11, by controlling the power generation device power conditioner 12, based on the control settings determined by the cloud server 60 based on monitoring results. In addition, the power storage control device 40 performs charging to the storage battery 21, by the generated electrical power which is outputted of the solar photovoltaic device 11, by controlling the storage battery power conditioner 22, based on the control settings determined by the cloud server 60 based on monitoring results.

In addition, the power storage control device 40 collects various past record information related to operation of the solar photovoltaic device 11. The power storage control device 40, for example, collects the past records of the generated electrical power amount of the solar photovoltaic device 11, via the power generation device power conditioner 12. In addition, the power storage control device 40 collects past records of power consumption by monitoring the electrical power supplied to the storage battery 21, load apparatus 30 and power storage control device 40. Furthermore, the power storage control device 40 collects past records of purchased electrical power amount (purchased electric amount), by monitoring the electric power grid. The power storage control device 40 sends the past record information collected in this way to the cloud server 60.

The cloud server 60 estimates the generated electrical power amount which is generated by the solar photovoltaic device 11 using sunlight, and the purchased electrical power amount which is purchased by the consumer via the electric power grid, by analyzing the past records information received from the power storage control device 40, and weather information acquired from an external server 70 described later. Then, the cloud server 60 monitors the estimation results, and in the case of being determined that the purchased electrical power amount falls below the first threshold based on the monitoring results, sends control settings for suppressing the generated electrical power which is outputted of the solar photovoltaic device 11 to the power storage control device 40. Furthermore, the cloud server 60, in the case of being determined that the purchased electrical power amount falls below the second threshold which is a threshold greater than the first threshold based on the monitoring results, sends the control settings for performing charging related to the storage battery 21 to the power storage control device 40, according to the generated electrical power which is outputted of the solar photovoltaic device 11.

In other words, in the present embodiment, by estimating the generated electrical power amount and purchased electrical power amount, it is possible to suppress the generated electrical power which is outputted of the solar photovoltaic device 11, and charge to the storage battery 21 at the appropriate timing. It is thereby possible to effectively use the generated electrical power by control performed at the appropriate timing. It should be noted that further details of this power storage control device 40 and cloud server 60 are described later by referencing FIGS. 2 and 3.

The external server 70 is a server which provides weather information. The external server 70 sends the weather information of the area in which the solar photovoltaic device 11 is installed to the cloud server 60. The external server 70 may be a server operated by a meteorological agency or the like. Alternatively, it may be a server operated by an operation business itself of the power control system S, or business affiliated with this operation business.

The management terminal 80 is a terminal for managing the cloud server 60. The operation business or consumer of the power control system S can reference the past results information of the electrical power amount, estimation results of the electrical power amount, etc. stored in the cloud server 60 by using the management terminal 80. In addition, using the management terminal 80, the operation business or consumer can record or update in the cloud server 60 the information related to each apparatus used by the consumer (e.g., model of solar photovoltaic device 11, and number of solar panels), and information such as the contract terms with the electric power company. Furthermore, using the management terminal 80, it is possible to set the first threshold and second threshold, and appropriately change the standard, etc. for determining these thresholds.

The network N, for example, is realized by any of the Internet, LAN (Local Area Network) and phone network system, or a network made by combining these.

An explanation has been provided for each apparatus included in the power control system S above. It should be noted that, in the drawings, although each apparatus is illustrated as one unit each, this is merely an exemplification, and each of these apparatuses may be included in any number of units in the power control system S. In addition, the constituent elements for switching the supply path of generated electrical power during power outage, other than the constituent elements illustrated in FIG. 1, are also connected to the consumer-side wiring 52; however, these constituent elements will be described later by referencing FIG. 4.

<Configuration of Power Storage Control Device>

Figure 2:
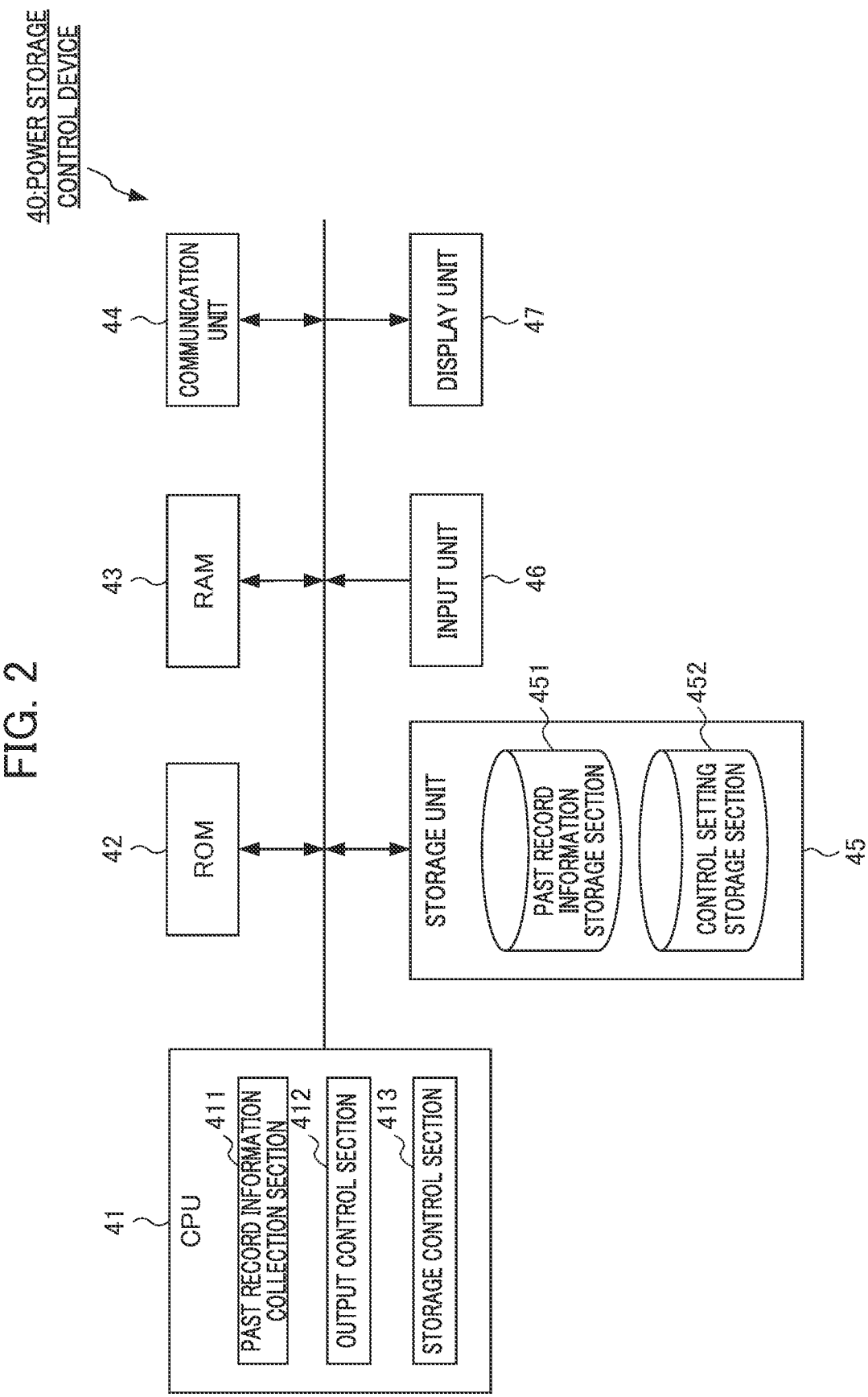
FIG. 2 is a block diagram showing an example of the configuration of a power storage control device according to an embodiment of the present disclosure.

Next, an explanation will be provided for the configuration of the power storage control device 40 by referencing the block diagram of FIG. 2. As shown in FIG. 2, the power storage control device 40 includes: a CPU (Central Processing Unit) 41, ROM (Read Only Memory) 42, RAM (Random Access Memory) 43, communication unit 44, storage unit 45, input unit 46 and display unit 47. Each of these parts is bus connected by signal wire, and send/receive signals with each other.

The CPU 41 executes various processing in accordance with programs recorded in the ROM 42, or programs loaded from the storage unit 45 into the RAM 43. Data, etc. required upon the CPU 41 executing the various processing is stored as appropriate in the RAM 43.

The communication unit 44 performs communication control for the CPU 41 to perform communication with other devices included in the power control system S. The storage unit 45 is configured by semiconductor memory such as DRAM (Dynamic Random Access Memory), and stores various data.

The input unit 46 is configured by external input devices such as various buttons and a touch panel, or a mouse and keyboard, and inputs various information in response to instruction operations of the user. The display unit 47 is configured by a liquid crystal display or the like, and displays images corresponding to image data outputted by the CPU 41.

In addition, in the case of the power storage control device 40 performing operation processing unique to the present embodiment, a past record information collection section 411, output control section 412 and storage control section 413 function in the CPU 41, as shown in FIG. 2. In addition, a past record information storage section 451 and control setting storage section 452 are established in a region of the storage unit 15.

The past record information storage section 451 stores various past record information related to operation of the solar photovoltaic device 11 collected by a past record information collection section 411 described later. The control setting storage section 452 stores the control settings received from the cloud server 60.

The past record information collection section 411 is a portion which collects various past record information related to operation of the solar photovoltaic device 11. The past record information collection section 411 collects the past records of generated electrical power amount of the solar photovoltaic device 11 via the power generation device power conditioner 12, for example. In addition, the past record information collection section 411 collects the past records of electrical power consumption amount, by monitoring the electrical power supplied to the storage battery 21, load apparatus 30 and power storage control device 40. Furthermore, the past record information collection section 411 collects past records of purchased electrical power amount, by monitoring the electric power grid.

It should be noted that the past record information collection section 411 may acquire past record information from a wattmeter in the residence which measures the electrical power, or a smart meter installed by an electric power company. In addition, the past record information collection section 411 may connect to HEMS (Home Energy Management System), and collect past record information from the HEMS. Furthermore, the past record information collection section 411 may collect the past record information, by communication compliant to a standard such as ECHONET Lite (registered trademark) from electrical equipment included in the load apparatus 30.

Alternatively, the past record information collection section 411 may further include a function as a wattmeter consisting of a pair of a fixed coil and moving coil, for example. Then, the past record information collection section 411 may acquire past record information, by the past record information collection section 411 itself executing measurement by the function of this wattmeter.

The past record information collection section 411 causes the collected past record information to be stored in the past record information storage section 451. In addition, the past record information collection section 411 is a portion which sends past record information stored in 51 to the cloud server 60 based on predetermined conditions, upon associating with identification information of the solar photovoltaic device 11. For example, the past record information sending section 112 sends the past record information to the cloud server 60 at predetermined time intervals. It should be noted that the sending of past record information to the cloud server 60 may be performed by the past record information collection section 411 in this way, but is not limited thereto. For example, the past record information may be sent directly to the cloud server 60 from each apparatus (solar photovoltaic device 11, etc.) other than the power storage control device 40, without going through the past record information collection section 411.

The output control section 412 suppresses generated electrical power which is outputted of the solar photovoltaic device 11, by controlling the power generation device power conditioner 12, based on the control settings stored by the control setting storage section 452.

The power storage control section 413 performs charging to the storage battery 21, by the generated electrical power which is outputted of the solar photovoltaic device 11, by controlling the storage battery power conditioner 22, based on the control settings stored by the control setting storage section 452. These control settings are control settings determined by the cloud server 60 based on the monitoring results or predetermined thresholds, as mentioned above.

<Configuration of Cloud Server 60>

Figure 3:
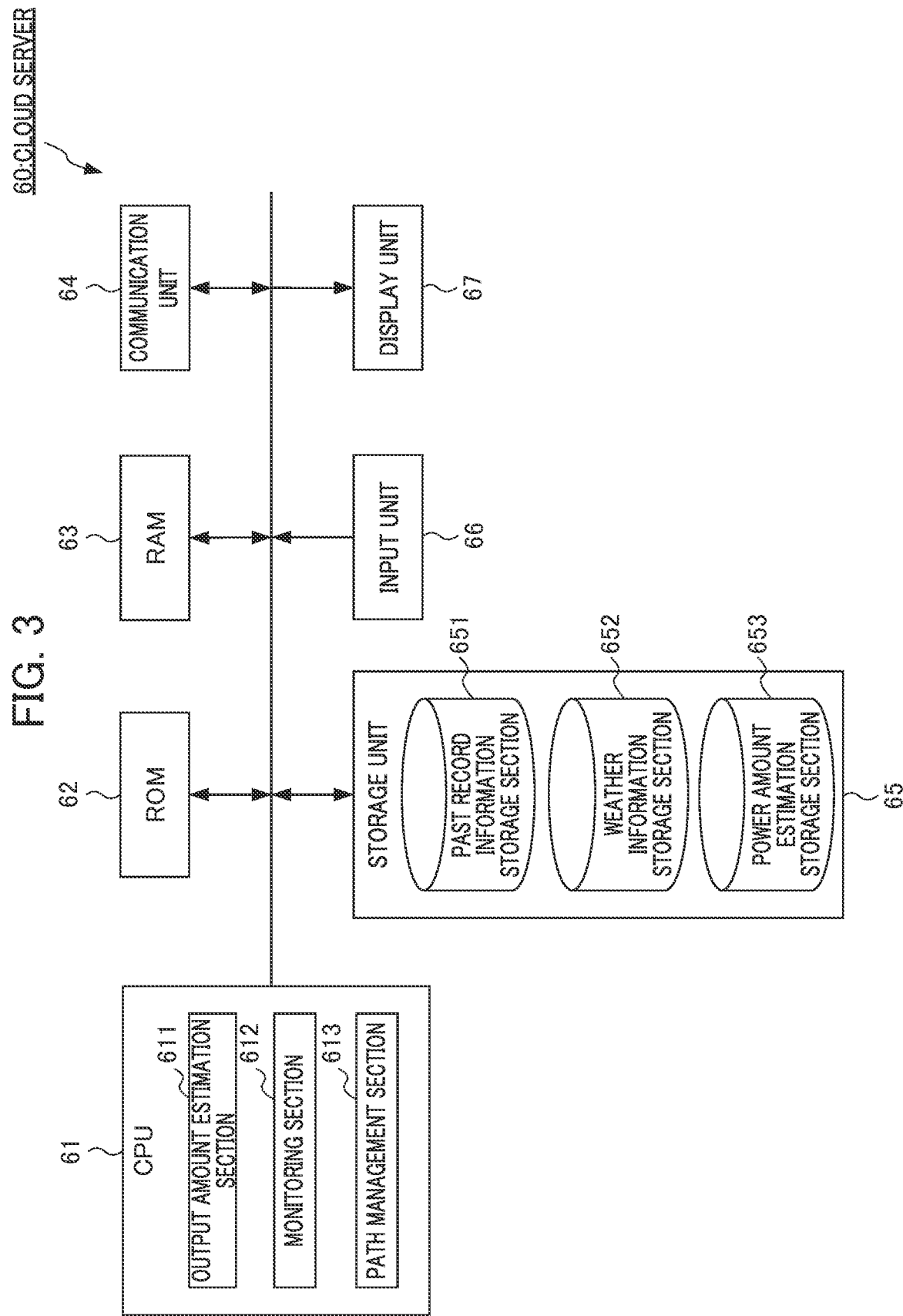
FIG. 3 is a block diagram showing an example of the configuration of a cloud server according to an embodiment of the present disclosure.

Next, an explanation is provided for the configuration of the cloud server 60 by referencing the block diagram of FIG. 3. As shown in FIG. 3, the cloud server 60 includes a CPU 61, ROM 62, RAM 63, communication unit 64, storage unit 65, input unit 66 and display unit 67. Each of these parts is bus connected by signal wire, and send/receive signals with each other.

Herein, a function as hardware of each of these parts is equivalent to the function as hardware of each part of the same name with only the reference number differing, possessed by the aforementioned power storage control device 40. Therefore, redundant explanations will be omitted.

In addition, in the case of the cloud server 60 performing operation processing unique to the present embodiment, the output amount estimation section 611, monitoring section 612 and path management section 613 function in the CPU 61, as shown in FIG. 3. In addition, a past record information storage section 651, weather information storage section 652 and power amount estimation storage section 653 are established in a region of the storage unit 65.

The past record information storage section 651 stores various past record information received from the power storage control device 40, information related to each apparatus used by the consumer acquired from the management terminal 80, and information such as contract terms with the electric power company.

The weather information storage section 652 stores weather information received from the external server 70. The weather information is weather information of the area in which the solar photovoltaic device 11 is installed, and is information such as the weather, daylight hours, sunlight duration, temperature and humidity. In addition, the weather information includes conventional weather information predicted by a specialized agency such as a meteorological agency. For example, it is weather information from present until the next week, and includes estimated values for every 30 minutes. In addition, in order to perform comparison between the future weather information and past weather information, past weather information may be included.

The power amount estimation storage section 653 stores the electrical power amount estimated by the power amount estimation section 611 described later. For example, for the generated electrical power amount generated by the solar photovoltaic device 11 using sunlight, and purchased electrical power amount purchased by the consumer via the electric power grid, estimated values for every 30 minutes are stored.

The power amount estimation section 611 estimates estimated values for every 30 minutes, of the generated electrical power amount generated by the solar photovoltaic device 11 using sunlight and the purchased electrical power amount purchased by the consumer via the electric power grid, for example, as the electrical power amount as described above. The estimation is performed based on information such as the past record information stored in the past record information storage section 651, and weather information stored in the weather information storage section 652.

For example, in the case of solar photovoltaic generation, the power generation amount changes depending on the weather such as sunlight duration and air temperature. For example, the corresponding relationship with sunlight duration is the strongest, and the power generation amount increases as the sunlight duration becomes greater. In addition, the power generation amount decreases as the temperature becomes higher. In other words, when the intensity of solar irradiation is great and air temperature is low, the power generation amount becomes the greatest. In addition, even in a case of the air temperature being high, since the temperature of photovoltaic module falls to some extent when the wind is strong, the power generation amount increases by this amount. Therefore, the power amount estimation section 611, in the case of estimating the power generation amount of the future for a certain time slot, estimates the power generation amount of the future for this certain time slot, based on the estimated values for sunlight duration, air temperature and wind conditions of the future of this certain time slot, and information such as the model of solar photovoltaic device 11 and number of solar panels installed.

Furthermore, in the case of wind powered power generation, the power generation amount changes depending on the wind conditions, for example. Therefore, the power amount estimation section 611 estimates the estimated value of power generation amount, based on the strength of wind, length of time for which wind of at least a certain strength is blowing, etc.

In addition, for the case of any of the solar power generation and wind power generation, the power generation amount changes according to the difference in the installation state such as installation angle and installation orientation of solar panels. For this reason, even the same solar photovoltaic device 11 or the same weather information, a difference will arise in the power generation amount. Therefore, when configuring to further perform estimation based on a past power generation amount, it is possible to further improve the accuracy of estimation. In this case, the power amount estimation section 611, for example, in the case of estimating the power generation amount of the future for a certain time slot, establishes the power generation amount of a past time slot resembling the estimated values for the sunlight duration, air temperature and wind conditions of the future of this certain time slot as the estimated value of generated power amount of this future certain time slot. It should be noted that, even for the case of generating power using another renewable energy other than sunlight and wind power, it is possible to estimate the estimated value of power generation amount, basing on the estimated values of weather information having a correlation with the power generation amount of this renewable energy.

In addition, the estimated value of the purchased electrical power amount can be calculated by subtracting the estimated value of power generation amount from the estimated value of electrical power amount consumed by the consumer (i.e. estimated value of power demand). This is because this electrical power amount after subtraction is the electrical power amount for which a need arises to purchase due to not being satisfied by power generation. Herein, electrical power amount purchased by the consumer shows various trends depending on differences in load configuration; therefore, it estimated based on the electrical power amount consumed in the past. For this reason, the power amount estimation section 611 performs estimation of the electrical power amount consumed by the consumer, based on the total past consumed power amount of the consumer. For example, the average value for past consumed electrical power amount of the consumer in the same time slot as the certain time slot in the future is defined as the estimated value of the electrical power amount consumed by the consumer in this certain time slot in the future.

In this case, when configuring so as to further perform estimation based on the weather information or operation information of a factory, it is possible to further improve accuracy of estimation. For example, when the winter season air temperature is low, the electricity consumption amount increases accompanying a heating demand increase. This is a trend which is the same in both a factory and residence. In this case, the power amount estimation section 611 can estimate the electrical power amount consumed by the consumer, by correcting the total of the past consumed electrical power amount of the consumer based on the estimated values of air temperature in the future of a certain time slot, for example.

The power amount estimation section 611 stores the estimated value every 30 minutes for the estimated value of the generated electrical power amount and purchased electrical power amount estimated in this way, for example, in the power amount estimation storage section 653.

The monitoring section 612 monitors the estimated values of generated electrical power amount and purchased electrical power amount estimated by the power amount estimation section 611 and stored in the power amount estimation storage section 653. Then, the monitoring section 612, in the case of the generated electrical power amount exceeding the amount which should suppress output and there being a time slot in which it is determined that the purchased electrical power amount falls below the first threshold, based on the monitoring results, generates control settings for suppressing the generated electrical power which is outputted by the solar photovoltaic device 11 in this time slot, and sends to the power storage control device 40.

In addition, the monitoring section 612, in the case of the generated electrical power amount not being zero, and there being a time slot in which it is determined that the purchased electrical power amount falls below a second threshold which is a threshold greater than the first threshold, based on the monitoring results, generates control settings for performing charging to the storage battery 21 by the generated electrical power which is outputted by the solar photovoltaic device 11 in this time slot, and sends to the power storage control device 40.

It should be noted that this first threshold is set to a value such that reverse power flow to the electric power grid 51 does not occur. In addition, this second threshold is set to a value such that purchased electrical power does not arise even if performing charging to the storage battery 21. For example, these thresholds are set by the operation business of the power control system S, according to the environment, etc. in which implementing the present embodiment.

The path management section 613, in the case of the electric power grid 51 having power outage, switches the supply path of generated electrical power to each apparatus connected to the consumer-side wiring 52. An explanation will be provided for the reason of performing switching during such power outage. In the present embodiment, a normal situation is premised in which electrical power is supplied from an electric power company to the electric power grid 51. However, generally, in the case of the electric power grid having power outage, parallel off of the energy power generation facility and storage battery facility (i.e. switching, or stopping) is mandatory. This in order to prevent disasters such as electric shock of repair managers during repair of the distribution network.

Therefore, during power outage, it is necessary to isolate the solar photovoltaic device 11 and storage battery 21 from the electric power grid 51 also in the present embodiment. However, in a case assuming that the solar photovoltaic device 11 and storage battery 21 were connected only via the electric power grid 51, there would be no way to recharge the storage battery 21. Therefore, in the present embodiment, in the case of the electric power grid 51 having power outage, recharging the storage battery 21 is made possible by switching the path between each apparatus connected to the consumer-side wiring 52.

Figure 4:
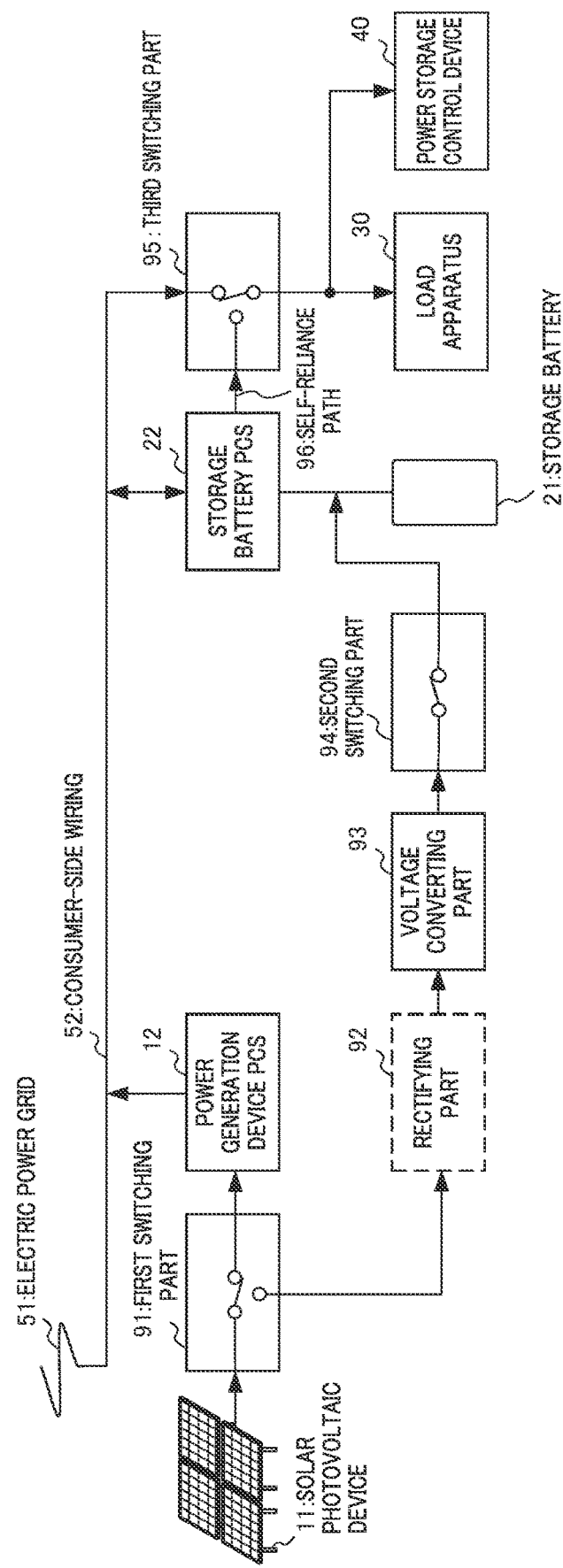
FIG. 4 is a view showing constituent elements for switching the supply path of generated electrical power during power outage, in an embodiment of the present disclosure.

The constituent elements for switching the supply path of generated electrical power during power outage will be described later by referencing FIG. 4. As shown in FIG. 4, the present embodiment includes a first switching part 91, rectifying part 92, voltage converting part 93, second switching part 94 and third switching part 95, as constituent elements for switching the supply path. These realize the switching of the supply path based on the control of a path management section 613.

As a premise, when normal (i.e. non-power outage time), the generated electrical power which the solar photovoltaic device 11 generated using sunlight as mentioned above is supplied to the storage battery power conditioner 22, load apparatus 30, or power storage control device 40, via the first switching part 91, power generation device power conditioner 12, consumer-side wiring 52 and third switching part 95.

Then, in the case of power outage occurring, the path management section 613 realizes switching of the supply path, by switching the first switching part 91, second switching part 94 and third switching part 95. More specifically, the path management section 613 configures so that the generated electrical power which the solar photovoltaic device 11 generated using sunlight is outputted to the rectifying part 92, by switching the first switching part 91. The rectifying part 92 is provided in the case of the generated electrical power from the solar photovoltaic device 11 being alternating current. Then, the rectifying part 92 converts the generated electrical power of alternating current into direct current, and outputs the generated electrical power after conversion to the voltage converting part 93. However, in the case of the generated electrical power from the solar photovoltaic device 11 being direct current, it is possible to omit the rectifying part 92. For this reason, the rectifying part 92 is shown by a dashed line in the drawings. The voltage converting part 93 converts the generated electrical power of direct current to a voltage suited to the storage battery 21, and outputs to the second switching part 94.

The path management section 613 configures so that the generated electrical power after conversion by the voltage converting part 93 is outputted to the storage battery 21, by switching the second switching part 94. It is thereby possible to charge the storage battery 21 with the generated electrical power. In addition, the path management section 613 monitors the power storage amount of the storage battery 21, and in the case of the power storage amount becoming at least a predetermined amount, configures so as to isolate the second switching part 94 by switching the second switching part 94, and so that the generated electrical power after conversion by the voltage converting part 93 is not outputted to the storage battery 21. It is thereby possible to prevent the storage battery 21 from being overcharged. Then, the path management section 613, in the case of the power storage amount becoming less than predetermined amount again, performs recharging by switching the second switching part 94. By configuring in this way, it is possible to charge the storage battery 21 with the generated electrical power, in a state isolating the solar photovoltaic device 11 and storage battery 21 from the electric power grid 51, by the path management section 613 performing switching of the supply path.

In addition, the path management section 613 configures so that the stored electrical power which was stored in the storage battery 21 is outputted to the third switching part 95, by controlling the storage battery power conditioner 22. In addition, the path management section 613 configures so that the stored electrical power which was stored in the storage battery 21 is supplied to the load apparatus 30 or power storage control device 40, by switching the third switching part 95. In other words, it is configured so that the stored electrical power is supplied with the illustrated path as a self-reliance path 96. By configuring in this way, it is possible to supply the stored electrical power to the load apparatus 30 or power storage control device 40, in a state isolating the solar photovoltaic device 11 and storage battery 21 from the electric power grid 51, by the path management section 613 performing switching of the supply path.

<Operation Processing>

Figure 5:
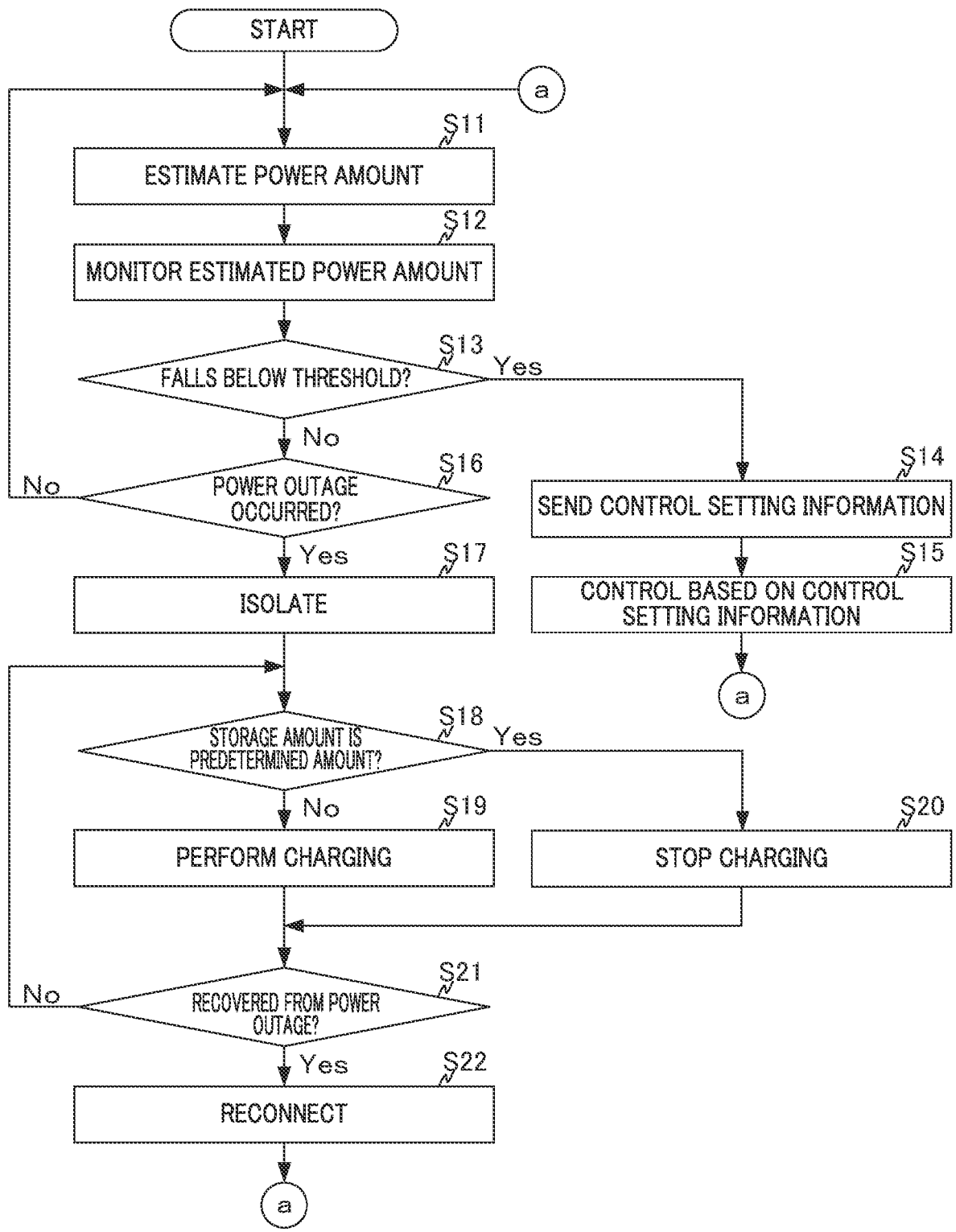
FIG. 5 is a flowchart for explaining the flow of operation processing executed by a power control system according to an embodiment of the present disclosure.

A detailed explanation was provided above for the configurations of the power storage control device 40 and cloud server 60. Next, the flow of operation processing executed by the present embodiment will be explained by referencing the flowchart of FIG. 5. It should be noted that the sending of past record information to the cloud server 60 by the past record information collection section 411, the sending of weather information to the cloud server 60 by the external server 70, and management related to the cloud server 60 by the management terminal 80 are executed as appropriate in parallel with the processing shown in the flowchart of FIG. 5.

In Step S11, the power amount estimation section 611 estimates the generated electrical power amount and purchased electrical power amount. In Step S12, the monitoring section 612 monitors the estimated values for the generated electrical power amount and purchased electrical power amount estimated in Step S11.

In Step S13, the monitoring section 612 determines whether the purchased electrical power amount falls below the first threshold or second threshold. In the case of the purchased electrical power amount falling below the first threshold or second threshold, it is determined as YES in Step S13, and the processing advances to Step S14. On the other hand, in the case of the purchased electrical power amount not falling below the first threshold or second threshold, it is determined as NO in Step S13, and the processing advances to Step S16.

In Step S14, the monitoring section 612 generates control settings for performing control according to the determination results in Step S13, and sends these generated control settings to the power storage control device 40.

In Step S15, the output control section 412 or power storage control section 413 executes output control of generated electrical power or charging control to the storage battery 21, based on the control settings sent in Step S13. Then, the processing returns to Step S11, and is repeated.

In Step S16, the path management section 613 determines whether power outage has occurred in the electric power grid 51. In the case of power outage occurring in the electric power grid 51, it is determined as YES in Step S16, and the processing advances to Step S17. On the other hand, in the case of power outage not occurring in the electric power grid 51, it is determined as NO in Step S16, and the processing returns to Step S11 and is repeated.

In Step S17, the path management section 613 isolates the solar photovoltaic device 11 and storage battery 21 from the electric power grid 51, by switching the first switching part 91 and third switching part 95.

In Step S18, the path management section 613 determines whether the power storage amount of the storage battery 21 is at least a predetermined amount. In the case of the power storage amount being at least the predetermined amount, it is determined as YES in Step S18, and the processing advances to Step S20. On the other hand, in the case of the power storage amount not being at least the predetermined amount, it is determined as NO in Step S18, and the processing advances to Step S19.

In Step S19, the path management section 613 performs charging to the storage battery 21, by switching the second switching part 94. In Step S20, the path management section 613 stops charging to the storage battery 21, by switching the second switching part 94.

In Step S21, the path management section 613 determines whether the electric power grid 51 has recovered from power outage. In the case of the electric power grid 51 having recovered from power outage, it is determined as YES in Step S21, and the processing advances to Step S22. On the other hand, in the case of the electric power grid 51 not recovering from power outage, it is determined as NO in Step S21, and the processing returns to Step S18 and is repeated.

In Step S22, the path management section 613 reconnects the solar photovoltaic device 11 and storage battery 21 to the electric power grid 51, by switching the first switching part 91 and third switching part 95. Then, the processing returns to Step S11 and is repeated.

Therefore, according to the above explained operation processing, it is possible to solve the aforementioned problem in that a part of the renewable energy which should be available becomes wasted. In addition, accompanying this, it is possible to prevent a loss for the consumer from occurring. In addition, by the above explained operation processing, during power outage, it is possible to charge the storage battery 21 with generated electrical power, in a state isolating the solar photovoltaic device 11 and storage battery 21 from the electric power grid 51. In addition, it is possible to supply the stored electrical power to the load apparatus 30 or power storage control device 40, in a state isolating the solar photovoltaic device 11 and storage battery 21 from the electric power grid 51. In other words, it becomes possible to drive the load apparatus 30 or power storage control device 40 by the generated electrical power, without causing reverse power flow to occur during power outage. In other words, according to the power control system S that is the present embodiment, it is possible to more effectively use the generated electrical power which is generated using the renewable energy.

Modified Examples

Although an embodiment of the present disclosure has been explained above, this embodiment is merely an exemplification, and is not to limit the technical scope of the present disclosure. The present disclosure can assume various other embodiments, and various modifications such as omissions and substitutions can be performed within a scope not departing from the gist of the present disclosure. These embodiments and modifications thereof are encompassed in the scope and gist of the disclosure described in the present disclosure, and encompassed in the scope of the disclosure and equivalents thereto described in the claims. For example, embodiments of the present disclosure may be modified as in the following modified examples.

Figure 6:
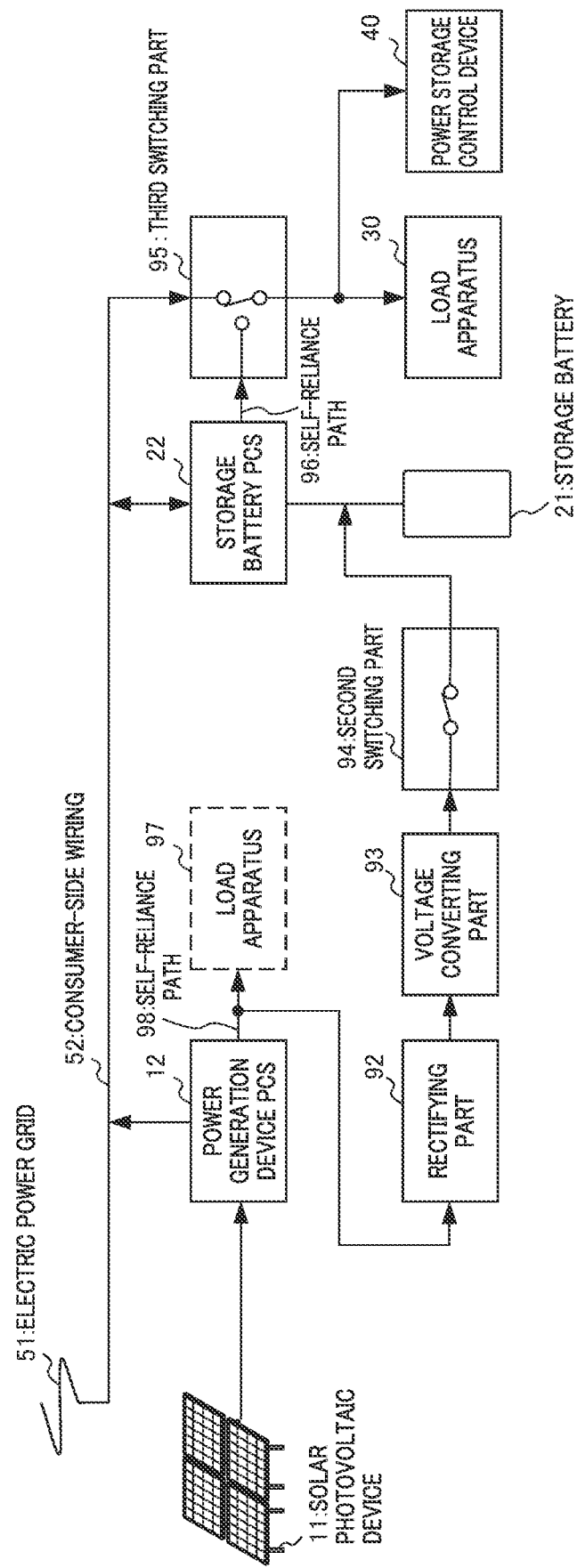
FIG. 6 is a view showing a modified example of constituent elements for switching the supply path of generated electrical power during power outage, in an embodiment of the present disclosure.

In the aforementioned embodiment, switching of the supply path by the path management section 613 was realized by the configuration shown in FIG. 4. It is not limited thereto, and the switching of the supply path by the path management section 613 may be realized by another configuration. An example of another configuration is shown in FIG. 6. It should be noted that, in the following explanation, the points of difference of the configuration shown in FIG. 6 from the configuration shown in FIG. 4 are explained, and redundant explanations for shared points will be omitted.

In the configuration shown in FIG. 4, in the case of power outage occurring in the electric power grid 51, the path management section 613 isolated the solar photovoltaic device 11 from the electric power grid 51, by switching the first switching part 91. Then, the generated electrical power is thereby prevented from reverse power flowing to the electric power grid 51. In contrast, the first switching part 91 is omitted in the configuration shown in FIG. 6. Then, in the case of power outage occurring in the electric power grid 51, the path management section 613 switches the output destination of the generated electrical power to the rectifying part 92 and load apparatus 97, by controlling the power generation device power conditioner 12. In other words, it configures so that the charging electrical power is supplied by the illustrated path as a self-reliance path 98. By configuring in this way, it is possible to supply stored electrical power to the load apparatus 30, power storage control device 40 and load apparatus 97, in a state isolating the solar photovoltaic device 11 from the electric power grid 51, by the path management section 613 performing switching of the supply path. In other words, it is made possible to exert similar effects as the configuration shown in FIG. 4 with the configuration shown in FIG. 6.

It should be noted that, since the output of the power generation device power conditioner 12 is alternating current, the rectifying part 92 becomes an essential constituent element. On the other hand, the load apparatus 97 directly connected to the self-reliance path 98 may be omitted. For this reason, the load apparatus 97 is shown by a dashed line in the drawings.

In addition, as another modified example, the aforementioned embodiment provides the cloud server 60, and performs the estimation of the power amount, and the generation of control settings based on monitoring with the cloud server 60. It is not limited thereto, and may be configured so as to implement a part or the entirety of these functions of the cloud server 60 in the power storage control device 40.

Furthermore, as another modified example, it may be configured so as to adopt the aforementioned embodiment, other than a case in which limitations are provided in the reverse power flow according to the contract terms with the electric power company, such as those assumed in the aforementioned embodiment. For example, in a case where charging by reverse power flow is accepted, but the selling electricity price is low, it may be configured so as to adopt the aforementioned embodiment. Alternatively, in the case of the consumer wanting to prioritize charging the storage battery 21 more the selling electricity, as a countermeasure for when there is a disaster or the like, it may be configured so as to adopt the aforementioned embodiment. For example, in the case of the consumer being a business for which the damage would be great during a disaster such as a business managing a cold storage warehouse, or a business raising livestock, it is configured so as to adopt the aforementioned embodiment.

As exemplified as these modified examples, the present disclosure is not limited to the aforementioned embodiments, and modifications, improvements, etc. in a scope which can achieve the object of the present disclosure are also encompassed by the present disclosure. In addition, in the aforementioned embodiment, an embodiment is realized by devices such as a cloud server; however, it is not particularly limited thereto, and it is possible to realize by common electronic equipment having an information processing function.

In addition, the aforementioned series of processing can be executed by hardware, or can be executed by software. In addition, one functional block may be configured by a single hardware unit, may be configured by a single piece of software, or may be configured by a combination of these. In other words, the functional configurations illustrated in FIGS. 2 and 3 are merely exemplifications, and are not limited thereto. In other words, it is sufficient if a function which can execute the aforementioned series of processing as a whole is provided to the power control system S, and which functional block is used in order to realize this function is not particularly limited to the example of FIG. 5.

For example, the functional configurations included in the present embodiment can be realized by a processor which executes arithmetic processing, and the processors which can be employed in the present embodiment include, in addition to those configured by various processing devices singularly such as a single processor, multiple processor and multi-core processor, a processor in which these various processing devices and processing circuits such as ASIC (Application Specific Integrated Circuit) or FPGA (Field-Programmable Gate Array) are combined.

In the case of executing a series of processing by software, the programs constituting this software is installed in a computer or the like from a network or recording medium. The computer may be a computer built into dedicated hardware. In addition, the computer may be a computer capable of executing various function, for example, a general-purpose personal computer, by installing various programs thereto.

The recording medium containing such programs may be provided to the user by being distributed separately from the device main body in order to provide the programs to the user, or may be provided to the user in a state incorporated into the device main body in advance. The recording medium distributed separately from the device main body is configured by a magnetic disc (including floppy disc), optical disc, magneto-optical disc or the like. An optical disc, for example, is constituted by CD-ROM (Compact Disc-Read Only Memory), DVD (Digital Versatile Disc), Blu-ray (registered trademark) Disc (Blu-ray) or the like. A magneto-optical disc is constituted by MD (Mini-Disc) or the like. In addition, the recording medium provided to the user in a state incorporated into the device main body in advance is constituted, for example, by the ROM 42 of FIG. 2 and ROM 62 of FIG. 3 on which the programs are records, or a hard disk included in the storage unit 45 of FIG. 2 or storage unit 65 of FIG. 3.

It should be noted that, in the present disclosure, the steps defining the program recorded in the storage medium include not only the processing executed in a time series following this order, but also processing executed in parallel or individually, which is not necessarily executed in a time series. In addition, in the present specification, a term system shall mean a general device configured from a plurality of devices, a plurality of means, and the like.

What is claimed is:

1. A power control system comprising:
a monitor configured to monitor a generated electrical power amount which is generated by a power generator using renewable energy and a purchased electrical power amount purchased by a consumer via an electric power grid;
an output controller configured to suppress generated electrical power outputted by the power generator, upon determining that the purchased electrical power amount falls below a first threshold, based on monitoring results of the monitor, the first threshold being set to a value such that reverse power flow to the electric power grid does not occur;
a storage power controller configured to perform charging to a storage battery by the generated electrical power outputted by the power generator, upon determining that the purchased electrical power amount falls below a second threshold which is a threshold greater than the first threshold, based on monitoring results of the monitor, the second threshold being set to a value such that purchased electrical power does not arise even if performing charging to the storage battery;
a switch configured to isolate the power generator from an electric power grid when the electric power grid has power outage;
a convertor configured to output generated electrical power which is outputted by the power generator by converting into voltage suited to the storage battery, when the electric power grid has power outage; and
a path management device configured to perform charging to the storage battery, by forming a supply path for supplying, to the storage battery, generated electrical power after conversion outputted by the convertor, when the electric power grid has power outage.

2. A power control system comprising:
a monitor configured to monitor a generated electrical power amount which is generated by a power generator using renewable energy and a purchased electrical power amount purchased by a consumer via an electric power grid;
an output controller configured to suppress generated electrical power outputted by the power generator, upon determining that the purchased electrical power amount falls below a first threshold, based on monitoring results of the monitor, the first threshold being set to a value such that reverse power flow to the electric power grid does not occur;
a storage power controller configured to perform charging to a storage battery by the generated electrical power outputted by the power generator, upon determining that the purchased electrical power amount falls below a second threshold which is a threshold greater than the first threshold, based on monitoring results of the monitor, the second threshold being set to a value such that purchased electrical power does not arise even if performing charging to the storage battery;

a power conditioner configured to supply generated electrical power which is outputted by the power generator to a load apparatus;

a convertor configured to output generated electrical power which is outputted by the power generator by converting into voltage suited to the storage battery, when the electric power grid has power outage; and a path management device configured to perform charging to the storage battery, by forming a supply path for supplying, to the storage battery, generated electrical power after conversion outputted by the convertor, when the electric power grid has power outage.

3. The power control system according to claim 1, further comprising:

a rectifier configured to convert generated electrical power of alternating current outputted by the power generator into direct current, and output the generated electrical power after conversion to the convertor.

4. The power control system according to claim 1, wherein the path management device is configured to stop charging to the storage battery, by isolating the supply path, when a stored power amount of the storage battery becomes at least a predetermined amount.

5. The power control system according to claim 1, further comprising:

an estimation device configured to estimate either or both of the generated electrical power amount which is a monitoring target of the monitor, and the purchased electrical power amount which is a monitoring target of the monitor.

6. The power control system according to claim 5, wherein the estimation device is configured to acquire weather information, and estimate either or both of the generated electrical power amount which is a monitoring target of the monitor, and the purchased electrical power amount which is a monitoring target of the monitor, based on the weather information thus acquired.

7. The power control system according to claim 2, further comprising:

a rectifier configured to convert generated electrical power of alternating current outputted by the power generator into direct current, and output the generated electrical power after conversion to the convertor.

8. The power control system according to claim 2, wherein the path management device is configured to stop charging to the storage battery, by isolating the supply path, when a stored power amount of the storage battery becomes at least a predetermined amount.

9. The power control system according to claim 3, wherein the path management device is configured to stop charging to the storage battery, by isolating the supply path, when a stored power amount of the storage battery becomes at least a predetermined amount.

10. The power control system according to claim 7, wherein the path management device is configured to stop charging to the storage battery, by isolating the supply path, when a stored power amount of the storage battery becomes at least a predetermined amount.

11. The power control system according to claim 1, further comprising:

an estimation device configured to estimate either or both of the generated electrical power amount which is a monitoring target of the monitor, and the purchased electrical power amount which is a monitoring target of the monitor.

12. The power control system according to claim 2, further comprising:

an estimation device configured to estimate either or both of the generated electrical power amount which is a monitoring target of the monitor, and the purchased electrical power amount which is a monitoring target of the monitor.

13. The power control system according to claim 3, further comprising:

an estimation device configured to estimate either or both of the generated electrical power amount which is a monitoring target of the monitor, and the purchased electrical power amount which is a monitoring target of the monitor.

14. The power control system according to claim 4, further comprising:

an estimation device configured to estimate either or both of the generated electrical power amount which is a monitoring target of the monitor, and the purchased electrical power amount which is a monitoring target of the monitor.

15. The power control system according to claim 7, further comprising:

an estimation device configured to estimate either or both of the generated electrical power amount which is a monitoring target of the monitor, and the purchased electrical power amount which is a monitoring target of the monitor.

16. The power control system according to claim 8, further comprising:

an estimation device configured to estimate either or both of the generated electrical power amount which is a monitoring target of the monitor, and the purchased electrical power amount which is a monitoring target of the monitor.

17. The power control system according to claim 9, further comprising:

an estimation device configured to estimate either or both of the generated electrical power amount which is a monitoring target of the monitor, and the purchased electrical power amount which is a monitoring target of the monitor.

18. The power control system according to claim 10, further comprising:

an estimation device configured to estimate either or both of the generated electrical power amount which is a monitoring target of the monitor, and the purchased electrical power amount which is a monitoring target of the monitor.

19. A power control method executed by a power control system, the method comprising:

monitoring a generated electrical power amount generated by a power generator using a renewable energy, and a purchased electrical power amount purchased by a consumer via an electric power grid;

suppressing generated electrical power outputted by the power generator, when a determination is made that the purchased electrical power amount falls below a first threshold, based on monitoring results of a monitor, the first threshold being set to a value such that reverse power flow to the electric power grid does not occur;

performing charging by a power storage controller on a storage battery by generated electrical power outputted by the power generator, when a determination is made that the purchased electrical power amount falls below a second threshold which is a threshold greater than the first threshold, based on monitoring results of the monitor, the second threshold being set to a value such that purchased electrical power does not arise even if performing charging to the storage battery;

isolating, by a switch, the power generator from an electric power grid when the electric power grid has power outage;

outputting, by a convertor, generated electrical power which is outputted by the power generator by converting into voltage suited to the storage battery, when the electric power grid has power outage; and performing charging to the storage battery, by a path management device, by forming a supply path for supplying, to the storage battery, generated electrical power after conversion outputted by the convertor, when the electric power grid has power outage.

\* \* \* \* \*